United States Patent Office 3,850,882
Patented Nov. 26, 1974

3,850,882
FLAME RETARDED COMPOSITIONS AND ADDITIVE SYSTEMS THEREFOR
John H. Underwood, Charlotte, N.C., and James S. Dix, Greenville, and Jerry O. Reed, Mauldin, S.C., assignors to Phillips Petroleum Co., Bartlesville, Okla.
No Drawing. Continuation-in-part of abandoned application Ser. No. 203,830, Dec. 1, 1971. This application May 16, 1973, Ser. No. 360,961
Int. Cl. C08f 45/56, 45/58
U.S. Cl. 260—45.75 R    6 Claims

ABSTRACT OF THE DISCLOSURE

Flame-retarded compositions of normally flammable polymers of olefins are provided by admixing with the polymer a flame-retarding additive system consisting essentially of (a) a halogen-containing aryl compound selected from those of the formulas

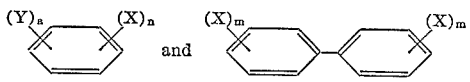

wherein X is selected from chlorine or bromine, Y is a hydrocarbon radical of 1 to 20 carbon atoms, $n$ is an integer of 3 to 6, $m$ is an integer of 3 to 5, and $a$ is an integer of 0 to 3; (b) stannic oxide; and (c) a hydrocarbon compound of the formula

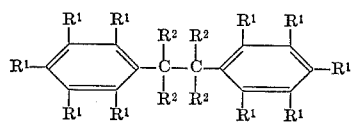

wherein $R^1$ is hydrogen or a hydrocarbon radical free of olefinic or acetylenic unsaturation; $R^2$ is an alkyl radical containing from 1 to 4 carbon atoms.

---

This application is a continuation-in-part of copending application Ser. No. 203,830, filed Dec. 1, 1971, now abandoned.

It is known that readily flammable plastics can be made difficultly flammable by the addition of halogen compounds. Flame-retarded plastic compositions are important, especially for the production of electrical insulating coatings which find application such as in house wiring, for small appliances, electronic equipment wire insulation, jacketing, and the like.

However, in rendering a plastic material fire-retardant or difficultly flammable, it is desirable that the physical properties of the plastic material itself not be significantly altered as a result of the addition of the flame-proofing agents. Accordingly, it is highly desirable that a retardant system be provided which will effect the desired flame retardancy to the plastic at the lowest possible levels of addition.

It is thus an object of this invention to provide novel flame-retarding additive systems which permit a reduction in the retardant level otherwise required to render the plastic self-extinguishing or nonburning. Another object of the invention is to provide novel flame-retardant plastic compositions in which the physical properties of the host plastic have not been significantly altered. Other aspects, objects and the several advantages of the invention will be apparent to those skilled in the art from the following discussion and the appended claims.

In accordance with this invention, we have discovered that in rendering normally flammable olefin polymers flame-retardant, the retardant additive level can be substantially reduced by utilizing an additive system or composition which consists essentially of the admixture of (a) a halogen-containing aryl compound selected from those of the formulas

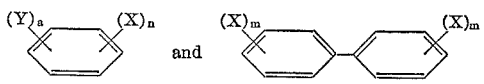

wherein X is selected from chlorine or bromine, Y is a hydrocarbon radical of 1 to 20 carbon atoms, $n$ is an integer of 3 to 6, $m$ is an integer of 3 to 5, and $a$ is an integer of 0 to 3; (b) stannic oxide; and (c) a hydrocarbon compound of the formula

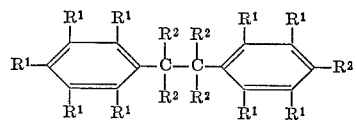

wherein $R^1$ is hydrogen or a hydrocarbon radical free of olefinic or acetylenic unsaturation and $R^2$ is an alkyl radical containing from 1 to 4 carbon atoms.

The size of the $R^1$ hydrocarbon radical is not critical; accordingly, there is no absolute limit to the carbon content thereof. However, when $R^1$ groups are present, they are generally in the range of 1 to 20 carbon atoms. In addition, when $R^1$ groups are present, it is sometimes preferred that at least one of the groups be in a para- or 4-position on the molecule.

The individual components of the inventive additive system are known compounds and can be prepared according to any conventional means known in the art. Examples of suitable compounds of (a) are:

1,3,5-tribromobenzene
1,3,5-trichlorobenzene
1,2,3,5-tetrabromobenzene
1,2,3,5-tetrachlorobenzene
hexabromobiphenyl
hexachlorobiphenyl
octabromobiphenyl
octachlorobiphenyl
pentabromotoluene
3,4,5-tribromo-1,2-diethylbenzene
pentachloro-tert-butylbenzene
2,4,6-tribromo-1,3,5-trimethylbenzene
2,4,6-tribromo-1-eicosylbenzene
2,4,6-trichloro-1,3-dodecylbenzene.

Examples of suitable compounds of formula (c) are:

2,3-dimethyl-2,3-diphenylbutane
2,3-dimethyl-2,3-di(4-isopropylphenyl)butane
2,3-dimethyl-2,3-di(4-benzylphenyl)butane
3,4-dimethyl-3,4-diphenylhexane
2-methyl-3-isobutyl-2,3-di(4-isobutylphenyl)butane
5,6-dimethyl-5,6-di(4-cyclohexylphenyl)decane
3,4-diethyl-3,4-di(3,4,5-triethylphenyl)hexane
2,3-dimethyl-2,3-di(3-hexadecylphenyl)butane
2,3-dimethyl-2,3-di(2,3,4,5,6-pentamethylphenyl)butane
2,3-dimethyl-2,3-di-(4-eicosylphenyl)butane and the like and mixtures thereof.

The additive systems of this invention are particularly suitable for rendering polypropylene flame-retardant. It is to be understood, however, that the inventive additive systems are broadly applicable to other normally flammable polymers of olefins having from 2 to 8 carbon atoms per molecule. Examples of other suitable polymeric compounds are polymers and copolymers of olefins such as those of ethylene and butene, 2-methyl-propene-1, ethylene-hexene-1, ethylene-propylene copolymers, and the like. Blends or mixtures of the above compounds also can be used in this invention.

The polymers of olefins which are stabilized according to the instant invention are commercially available, normally solid resins which can be formed by any of the numerous techniques known in the art. Polypropylene can be formed by the polymerization of propylene in an inert hydrocarbon medium at 25° to 110° C. The effluent from the reactor is treated to remove residual monomer by flashing, for example, solvent and soluble polymer are removed, and the catalyst is deactivated and extracted. Coordination catalysts suitable for polymerizing propylene are exemplified by a titanium halide, preferably $TiCl_3 \cdot 1/3 AlCl_3$, an aluminum compound, preferably a trialkylaluminum or alkylaluminum compound, such as diethylaluminum chloride and, optionally, a Lewis base. However, since the various types of polymers of olefins which can be rendered flame-resistant by the additive system of this invention are, as previously indicated, well known and commercially available materials, the process for their production is not considered to form a part of this invention.

The stabilized polymer system of this invention is prepared by admixing compounds (a), (b) and (c), as defined above, with the polymer in amounts such that the weight ratio of part (b) per part (a) is in the range of 0.005 to 20 and the weight ratio of part (c) per part (a) is in the range of 0.0025 to 20.

In the use of the adidtive systems of this invention, there is no definite upper limit for the amount of total aditives to be employed. Ordinarily the additives are used at the lowest level which will provide the desired degree of flame retardancy and which will produce the least adverse change in physical properties of the host material. The following ranges generally are employed:

| Additive | Parts per hundred parts host material | |
|---|---|---|
| | Broad | Preferred |
| (a) Aryl halide | 0.5 to 20 | 0.8 to 8. |
| (b) Stannic oxide | 0.1 to 10 | 0.4 to 4. |
| (c) Hydrocarbon additive | 0.05 to 10 | 0.16 to 1.6. |

The upper limit of total additive incorporated into any normally flammable organic material will vary with each host material. However, for one presently preferred embodiment of this invention, the preferred ranges listed above have been found to be most applicable to polypropylene.

The flame-retarded compositions can be produced in various manners. For example, intimate mixture of the thermoplastic composition and flame-retarding agents of the invention can be achieved by mixing the composition and the bromine compound at an elevated temperature in an extrusion press or a kneader. The two components also can be dissolved in a common solvent, the solution admixed with the polymer and the solvent subsequently removed. The stannic oxide can be added directly to the host plastic material by kneading at elevated temperatures. Other means of incorporating the various additives into the host polymer will be readily apparent to those skilled in the art and, as such, the manner of formulation of the flame-retarded polymeric composition is not considered to be critical to this invention. In addition, in the case of granular or bead-like plastic compositions, the surface of the granule can be coated with the flame-retardants prior to further processing.

It is to be understood that the mixture of this invention also can have incorporated therein the usual fillers, dyes, pigments, plasticizers, antistatic agents, stabilizing agents, and the like, if desired. These compounds are well known in the art and, for the sake of brevity, will not be listed here.

The following examples are presented to illustrate the invention, but it is to be understood that the invention is not intended to be limited thereto. In the examples, the parts specified are parts by weight per 100 parts of polymer (p.h.p.).

EXAMPLE I

Sample preparation

A series of samples were prepared for the LOI (limiting oxygen index) testing (described hereafter) by adding the dry ingredient or ingredients of the formulation to a polypropylene fluff and then masticating the mixture in a Brabender Plastograph under a nitrogen atmosphere for 5 minutes at 200° C., using a rotor speed of 50 r.p.m. The blended sample was then removed hot from the mixing chamber and pressed and cooled under nitrogen to form 1/8-inch sheet (125 mils). Five specimens of each sample were tested and their values averaged to give the reported LOI value. Specimens were 1/8-inch x 1/2-inch x 4 inches.

Each sample was prepared using 35 grams of polypropylene having a melt flow value of 3 (ASTM D-1238-62, Condition L) which was charged to the mixing chamber along with the additives, such as flame-retardants, stabilizers, adjuvant and the like, of the formulation. The formulations of the samples were as follows:

| | Parts | Grams |
|---|---|---|
| Polypropylene | 100 | 35 |
| Stannic oxide | 1 | 0.35 |
| Halide | ¹ Varied | 0.6–0.7 |
| Bicumyl | 0.4 | 0.14 |
| Antioxidant ² | 0.1 | 0.035 |

¹ 2.0 p.h.p. of hexabromobiphenyl or 1.75 p.h.p. of pentabromotoluene. (The halide additive was employed in such an amount that a 1.4 percent bromine content of total composition was obtained.)
² Phenolic antioxidant: Octadecyl [3-(3,5-di-t-butyl-4-hydroxyphenyl)]-propionate.

EXAMPLE II

Utilizing a series of samples prepared in accordance with Example I the effectiveness of the additives as a flame-retardant system was determined by measuring the LOI (limiting oxygen index) thereof. The following results were obtained:

| Run | Halide additive ¹ | Metal oxide, 1.0 p.h.p. | Adjuvant, 0.4. p.h.p. | LOI |
|---|---|---|---|---|
| 1 | Pentabromotluene (1.75 p.h.p.). | Stannic oxide | Bicumyl ² | .30 |
| 2 | | do | None | .20 |
| 3 | | Antimony trioxide | Bicymyl | .21 |
| 4 | Hexabromobiphenyl (2.0 p.h.p.). | Stannic oxide | do | .27 |
| 5 | | do | None | .18 |
| 6 | | Antimony trioxide | Bicumyl | .21 |

¹ Added in amounts sufficient to give bromine content of 1.4 percent of total composition.
² 2,3-dimethyl-2,3-diphenylbutane.

The above LOI values show that the three-component additive system of this invention provides satisfactory flame-retardant compositions which are superior to conventional antimony trioxide systems.

EXAMPLE III

Sample preparation

A series of samples were prepared for the LOI testing by adding the dry ingredient or ingredients of the formulation to a polypropylene fluff and then masticating the mixture in a Brabender Plastograph under a nitrogen atmosphere for 5 minutes at 200° C., using a rotor speed of 50 r.p.m. The blended samples were then removed hot from the mixing chamber and pressed and cooled under nitrogen to form 1/8-inch sheet (125 mils). Specimens 1/8-inch x 1/2-inch x 4 inches were cut from the pressed sheet and tested.

Each sample was prepared using 35 grams of polypropylene having a melt flow value of 3 (ASTM D-1238-62, Condition L) which was charged to the mixing chamber along with the additives such as flame-retardants, stabilizers, adjuvants and the like of the formulation. The formulation of the samples was as follows:

|  | Parts | Grams |
|---|---|---|
| Polypropylene | 100 | 35 |
| Stannic oxide | Varied | |
| Halide [1] | Varied | |
| Bicumyl [2] | Varied | |
| Antioxidant [3] | 0.1 | 0.035 |

[1] Pentabromotoluene.
[2] 2,3-dimethyl-2,3-diphenylbutane.
[3] Octadecyl[3-(3,5-di-t-butyl-4-hydroxyphenyl)]propionate.

EXAMPLE IV

Utilizing a further series of samples prepared in accordance with Example III, the effectiveness of the additives as a flame-retardant system was determined by measuring the LOI thereof. The following results were obtained:

| Run number | Halide additive [1] | $SnO_2$ | $Sb_2O_3$ | Adjuvant [2] | LOI |
|---|---|---|---|---|---|
| 7 | 0.8 | 0.4 | | 0.16 | 0.25 |
| 8 | 0.8 | | 0.4 | 0.16 | 0.19 |
| 9 | 8.0 | 4.0 | | 1.6 | 0.32 |
| 10 | 8.0 | | 4.0 | 1.6 | 0.26 |
| 11 | 3.0 | 1.5 | | 0.6 | 0.30 |
| 12 | 3.0 | | 1.5 | 0.6 | 0.23 |

[1] Pentabromotoluene.
[2] 2,3-dimethyl-2,3-diphenylbutane.

The above LOI values show that the three-component additive system of this invention provides satisfactory flame-retardant compositions, which are superior to conventional antimony trioxide systems.

LOI values (minimal volume fraction of oxygen in a slowly rising oxygen and nitrogen atmosphere necessary to sustain burning of a test specimen), where $$LOI = \frac{O_2}{O_2 + N_2}$$

as set forth in the examples, were determined using an apparatus as described in *Modern Plastics,* November 1966, pages 141, 142, 146, 148 and 192.

The $O_2$ value of air being 0.21 in theory, it is concluded that any resin formulation giving an LOI value greater than 0.21 would be flame-retardant. However, since factors such as product form and construction affect LOI, a value of 0.24 is considered minimal for a flame-retardant blend.

Variations and modifications are possible within the foregoing discussion and disclosure, without departing from the spirit or scope thereof.

That which is claimed is:

1. A flame-retardant composition comprising a normally flammable polymer of an olefin consisting of carbon and hydrogen and containing from 2 to 8 carbon atoms having admixed therein a stabilizing amount of a flame-retarding additive system which consists essentially of the admixture of (a) a halogen-containing aryl compound selected from those of the formulas

wherein X is selected from chlorine or bromine, Y is a hydrocarbon radical of 1 to 20 carbon atoms, $n$ is an integer of 3 to 6, $m$ is an integer of 3 to 5, and $a$ is an integer of 0 to 3; (b) stannic oxide; and (c) a hydrocarbon compound of the formula

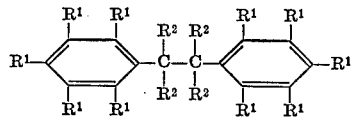

wherein $R^1$ is hydrogen or a hydrocarbon radical free of olefinic or acetylenic unsaturation and $R^2$ is an alkyl radical containing from 1 to 4 carbon atoms and wherein said compound (a) is present in an amount in the range of 0.5 to 20 parts per hundred parts of polymer, (b) is present in an amount in the range of 0.1 to 10 parts per hundred parts of polymer, and (c) is present in an amount in the range of 0.05 to 10 parts per hundred parts of polymer.

2. A composition according to claim 1 wherein said compound (a) is present in an amount in the range of 0.8 to 8 per hundred parts of polymer, (b) is present in an amount in the range of 0.4 to 4 parts per hundred parts of polymer, and (c) is present in an amount in the range of 0.16 to 1.6 parts per hundred parts of polymer.

3. A composition according to claim 1 wherein said polymer is a normally solid polypropylene, (a) is pentabromotoluene and (c) is 2,3-dimethyl-2,3-diphenylbutane.

4. A composition according to claim 2 wherein said polymer is a normally solid polypropylene, (a) is pentabromotoluene and (c) is 2,3-dimethyl-2,3-diphenylbutane.

5. A flame-retardant additive composition which comprises (a) a halogen-containing compound selected from those of the formulas wherein X is selected from chlorine or bromine, Y is a hydrocarbon radical of 1 to 20 carbon atoms, $n$ is an integer of 3 to 6, $m$ is an integer of 3 to 5, and $a$ is an integer of 0 to 3; (b) stannic oxide; and (c) a hydrocarbon compound of the formula wherein $R^1$ is hydrogen or a hydrocarbon radical free of olefinic or acetylenic unsaturation and $R^2$ is an alkyl radical containing from 1 to 4 carbon atoms, wherein the weight ratio of parts of (b) to parts of (a) is in the range of 0.005 to 20 and the weight ratio of parts of (c) to parts (a) is in the range of 0.0025 to 20.

6. An additive composition according to claim 1 wherein (a) is pentabromotoluene and (c) is 2,3-dimethyl-2,3-diphenylbutane.

References Cited

UNITED STATES PATENTS

| 3,093,599 | 6/1963 | Tamm et al. | 260—45.75 |
| 3,347,822 | 10/1967 | Jenkner | 260—45.75 |
| 3,420,786 | 1/1969 | Weber et al. | 260—45.7 |
| 3,441,524 | 4/1969 | Burger et al. | 260—2.5 |

OTHER REFERENCES

Combustion and Flame—vol. 10, 1966, pp. 135 to 139, article by Fenimore et al.

V. P. HOKE, Primary Examiner

U.S. Cl. X.R.

252—8.1; 260—45.7 R, 45.73 B